United States Patent [19]

Ngai et al.

[11] Patent Number: 4,884,190
[45] Date of Patent: Nov. 28, 1989

[54] HIGH PERFORMANCE PARALLEL VECTOR PROCESSOR HAVING A MODIFIED VECTOR REGISTER/ELEMENT PROCESSOR CONFIGURATION

[75] Inventors: Chuck H. Ngai, Endwell; Gerald J. Watkins, Endicott, both of N.Y.

[73] Assignee: International Business Machines Corp., Armonk, N.Y.

[21] Appl. No.: 320,889

[22] Filed: Mar. 8, 1989

Related U.S. Application Data

[63] Continuation of Ser. No. 711,329, Mar. 13, 1985, abandoned, and a continuation-in-part of Ser. No. 530,842, Sep. 9, 1983.

[51] Int. Cl.$^4$ .............................................. G06F 9/18
[52] U.S. Cl. .................................... 364/200; 364/748; 364/730
[58] Field of Search ................. 364/200 MS, 900 MS, 364/736, 748, 730

[56] References Cited

U.S. PATENT DOCUMENTS

| | | | |
|---|---|---|---|
| 3,106,689 | 10/1963 | Unger | 364/200 |
| 4,041,461 | 8/1977 | Kratz et al. | 364/200 |
| 4,041,471 | 8/1977 | Krossa et al. | 364/200 |
| 4,101,960 | 7/1978 | Stokes et al. | 364/200 |
| 4,128,880 | 12/1978 | Cray, Jr. | 364/200 |
| 4,162,534 | 7/1979 | Barnes | 364/900 |
| 4,171,536 | 10/1979 | Heuer | 364/200 |
| 4,172,287 | 10/1979 | Kawabe et al. | 364/736 |
| 4,179,734 | 10/1979 | O'Leary | 364/200 |
| 4,287,566 | 9/1981 | Culler | 364/754 |
| 4,298,936 | 11/1981 | Shapiro | 364/200 |
| 4,314,349 | 2/1982 | Batcher | 364/716 |
| 4,435,765 | 3/1984 | Uchida et al. | 364/200 |
| 4,490,786 | 12/1984 | Nakatani | 364/200 |

FOREIGN PATENT DOCUMENTS

| | | |
|---|---|---|
| 0053457 | 6/1982 | European Pat. Off. |
| 8400226 | 1/1984 | World Int. Prop. O. |

OTHER PUBLICATIONS

2938 Array Processor Overall Data Flow, IBM, 2/69, pp. 3-1 and 1-35.
IBM Technical Disclosure Bulletin, "Parallel Table Directed Translation", T. C. Chen et al., vol. 22, No. 6, 11/79, pp. 2489-2490.
"The Architecture of Pipelined Computers", Kogge, 1981, p. 207.
F. L. Alt et al.; "Advances in Computers: vol. 7, 1966, Academic Press (New York, US) J. C. Murtha: Highly Parallel Information Processing Systems", pp. 1-116, see pp. 14-17, Paragraphs 2.2-2.2.3.

*Primary Examiner*—Gary V. Harkcom
*Assistant Examiner*—Christopher H. Lynt
*Attorney, Agent, or Firm*—Arthur J. Samodovitz; David S. Romney; John H. Bouchard

[57] ABSTRACT

A parallel vector processor includes a plurality of vector registers, each vector register being subdivided into a plurality of smaller registers. A vector is stored in each vector register, the vector has a plurality of elements. The elements of the vector are assigned for storage in the smaller registers of the vector register. In the parallel vector processor, assume that each vector register is subdivided into M smaller registers. The first successive M elements of an N element vector are assigned for storage in the M smaller registers of the vector register. An element processor is connected to each smaller register. Therefore, the first successive M elements of the N element vector are processed by the element processors 1 through M. The second successive M elements of the N element vector are assigned for storage in the same M smaller registers. The third successive M elements of the N element vector are assigned for storage in the M smaller registers. The second and third successive M elements of the N element vector are each processed by the element processors 1 through M. As a result, if the elements of a vector must be processed sequentially, when a second element, stored in a smaller register, is ready for processing by an element processor, the processing of the second element need not wait the completion of the processing of a first element stored in the same vector register.

7 Claims, 7 Drawing Sheets

PRIOR ART

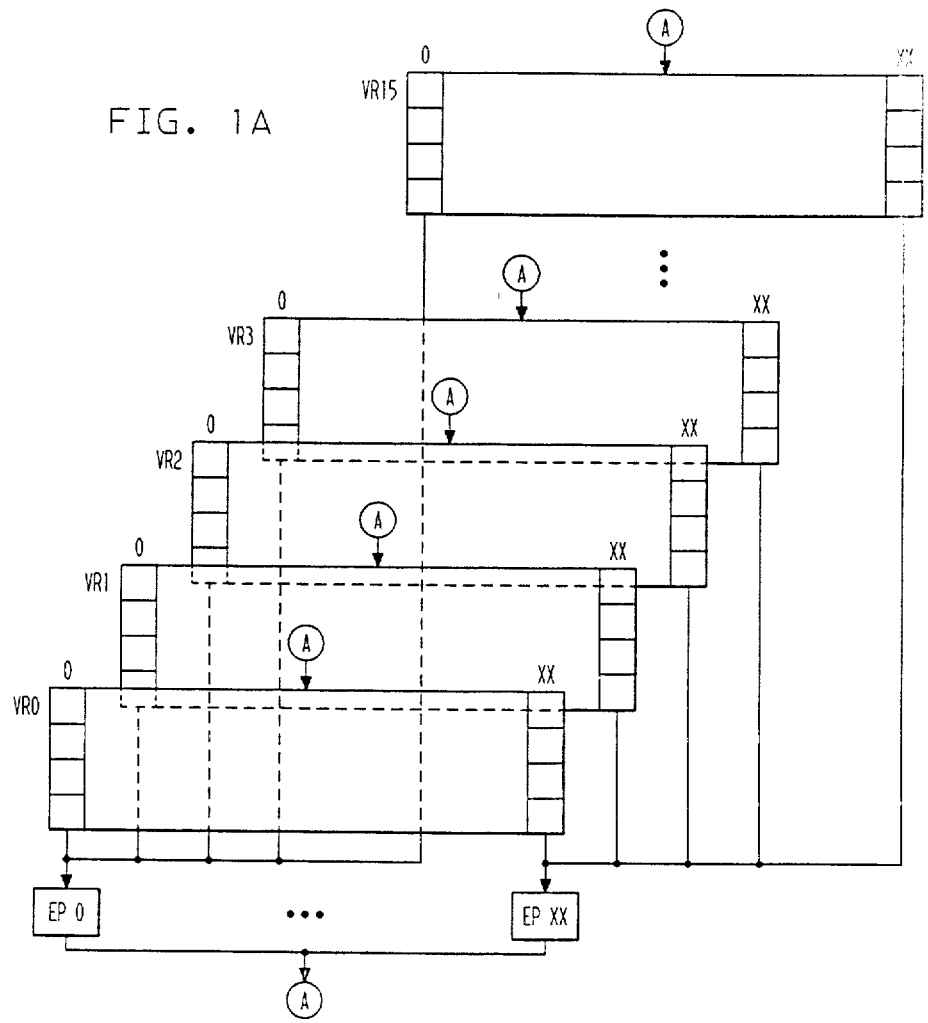
FIG. 1A
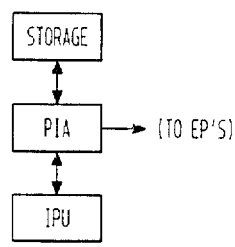

HIGH PERFORMANCE PARALLEL VECTOR PROCESSOR HAVING A MODIFIED VECTOR REGISTER/ELEMENT PROCESSOR CONFIGURATION

This application is a continuation of application Ser. No. 06/711,329 filed on Mar. 13, 1985, now abandoned and a continuation-in-part of application Ser. No. 06/530,842 filed Sept. 9, 1983.

This application is also copending with commonly assigned patent application Ser. No. 06/903,934 filed on Sept. 5, 1986 by Ngai, Wassell and WAtkins.

BACKGROUND OF THE INVENTION

1. Field of the Invention

The present invention pertains to a computer system, and more particularly, to a parallel vector processor in said computer system for rapidly processing a pair of vectors and storing the results of said processing.

2. Description of the Prior Art

A typical vector processor, such as the vector processor shown in FIG. 1 includes a plurality of vector registers, each vector register storing a vector. The vector comprises a plurality of vector elements. A pipeline processing unit is connected to a selector associated with the vector registers for receiving corresponding elements of a first vector from a first vector register and utilizing the corresponding elements to perform an arithmetic operation on the corresponding elements of a second vector stored in a second vector register. The results of the arithmetic operation are stored in corresponding locations of one of the vector registers, or in corresponding locations of a third vector register.

However, with this configuration, it is necessary to perform operations on each of the corresponding elements of the vectors in sequence. If the vectors include 128 elements, 128 operations must be performed in sequence. The time required to complete operations on all 128 elements of the vector is a function of the cycle time per operation of the pipeline unit as it operates on each of the corresponding elements.

As a result of increasing sophistication of computer systems, there is a need to increase the performance of the vector processor portion of the computer system by decreasing the time required to process or perform arithmetic operations on each of the corresponding elements of a plurality of vectors stored in the vector registers within the computer system.

Another vector processor, designed to increase the performance of the vector processor portion of a computer system as noted above, is shown in FIG. 2 of the drawings. This vector processor is termed a "parallel" vector processor. In FIG. 2, a plurality of vector registers are arranged in a parallel configuration, each vector register being subdivided into a plurality of smaller registers. Each smaller register of a vector register is designed to store four elements of the vector stored in the vector register, the vector being 128 elements in length. An element processor is connected to each corresponding smaller register of the plurality of vector registers.

However, with this configuration, it is necessary for one element processor to process four elements of a vector. If the elements of a vector are processed sequentially, the processing of a subsequent element (e.g. element 1) may have to await the completion of the processing of a previous element (e.g. element 0).

As noted above, there is a need to increase the performance of the vector processor portion of a computer system by decreasing the time required to process each of elements of a plurality of vectors stored in the vector registers of the computer system. In order to further increase the performance of the vector processor, one element processor should begin processing the subsequent element of a vector during the processing of a previous element of the vector by another element processor. As a result, the processing of the subsequent element would not need to await the processing of the previous element.

SUMMARY OF THE INVENTION

Accordingly, it is a primary object of the present invention to further improve the performance of the vector processor portion of a computer system by assigning each successive M-elements of an N-element vector stored in a vector register to a different element processor.

It is a further object of the present invention to further improve the performance of the vector processor portion of a computer system by assigning each successive M-elements of an N-element vector to a different element processor while limiting the number of element processors being utilized by the vector processor portion of the computer system.

In accordance with the present invention, assume a vector includes a total of N elements. Further, assume that this vector may be sub-divided into a plurality of sub-vectors, each sub-vector including a total of M elements. In addition, assume that there are a total of M element processors connected in parallel to a plurality of vector registers, there being a total of M vector registers. The above referenced objects of the present invention are fulfilled by assigning the first successive M elements of an N element vector, associated with each of the vector registers, to element processor numbers 1 through M, by assigning the second successive M elements of the N element vector to element processors 1 through M, and by repeating the assignment of the remaining successive elements of the N element vector, in M element order, to element processors 1 through M until no other remaining elements exist.

Further scope of applicability of the present invention will become apparent from the detailed description presented hereinafter. It should be understood, however, that the detailed description and the specific examples, while representing a preferred embodiment of the invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein:

FIG. 1a illustrates, in three dimensions, another typical parallel vector processor;

DETAILED DESCRIPTION OF THE PREFERRED EMBODIMENT

Figure 1:
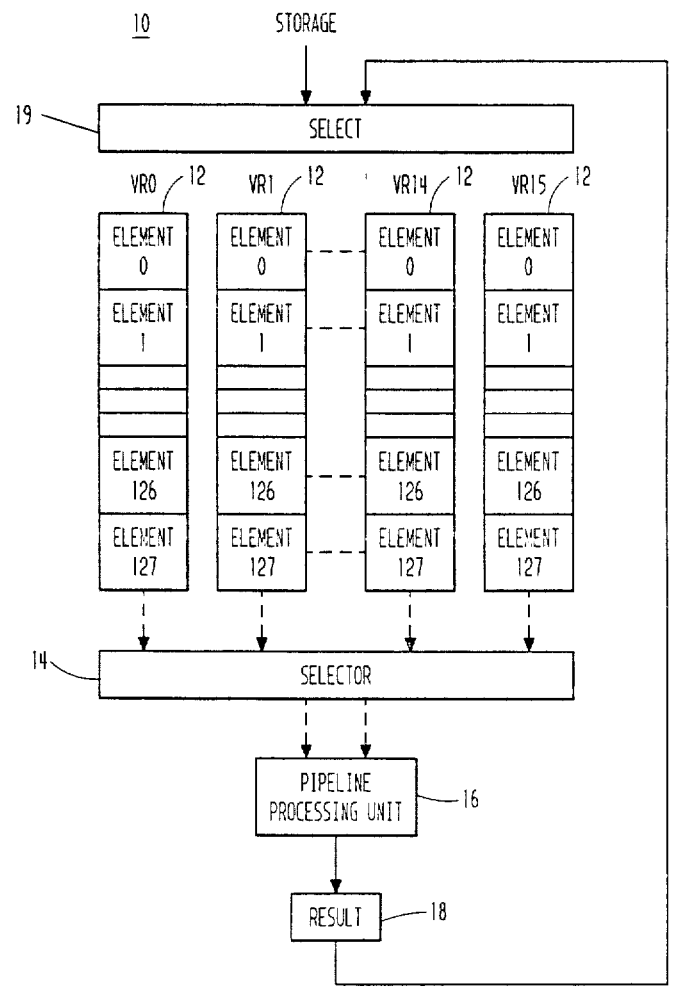
FIG. 1 illustrates a typical vector processor.

Referring to FIG. 1, a typical pipeline vector processor 10 is illustrated. In FIG. 1, a plurality of vector registers 12 (VR0 through VR15) are shown, each register storing 128 elements (element 0 through element 127). In the preferred embodiment, an element comprises a four (4) byte binary word. A selector 14 is connected to each of the vector registers 12 for selecting corresponding elements from the vector registers 12 and gating the selected elements through to a pipeline processing 2 unit 16. The pipeline processing unit 16 is connected to the selector for receiving the 4 corresponding elements and for performing selected 5 operations on said elements, such as arithmetic 6 operations. For example, the processing unit 16 may 7 receive element 0 from vector register VR0 and 8 corresponding element 0 from vector register VR15 and perform the following arithmetic operation on said elements: VR0+VR15→VR3. In this arithmetic operation, each of the binary bits of element 0 in VR0 is added to each of the binary bits of element 0 in VR15, and the resultant sum is stored in the element 0 position of vector register VR3. A result register 18 is connected to the pipeline processing unit for storing the resultant sum received from the pipeline processing unit. The result register 18 is connected to each of the vector registers 12 via a select gate 19 for transferring the resultant sum from the result register 18 to vector register VR3.

The configuration illustrated in FIG. 1 possesses certain disadvantages. Utilizing the example, a first element is selected from register VR0 and a corresponding element is selected from register VR15. The elements are added in the above manner. A second element is selected from registers VR0 and VR15 and are added together in the above manner. Each of the 128 elements must be selected from registers VR0 and VR15 and added together, in sequence, in order to complete the processing of the vectors stored in vector registers VR0 and VR15. As a result, the time required to complete the processing of the vectors stored in vector registers VR0 and VR15 is a function of the number of elements per vector and the cycle time required to process a set of corresponding elements per vector. The performance of a vector processor could be improved by decreasing the time required to process a pair of vectors stored in a set of vector registers.

Referring to FIG. 1a, another parallel vector processor is illustrated in three dimensions. In FIG. 1a, a plurality of vector registers VR0 through VR15 are disposed approximately parallel to one another. Each vector register is subdivided into a plurality of smaller registers numbered 0 through XX. Each of the corresponding smaller registers "0" among the plurality of vector registers VR0 through VR15 are connected to one element processor, processor EP0. Similarly, each of the corresponding smaller registers, "1" among the plurality of vector registers VR0-VR15, are connected to one element processor, processor EPI, etc. Each of the corresponding smaller registers XX among the plurality of vector registers VR0-VR15 are connected to element processor EPXX. The output of the element processors EP0 through EPXX are tied to one junction point, the junction being fed back and connected to the input of each vector register. A processor interface adaptor (PIA) is connected to the input of element processors (EP0-EPXX) in a specific manner, the manner depending upon the specific parallel vector processor configuration, two different configurations being discussed with reference to FIGS. 2 and 6 of the drawings. The configuration of the present invention is discussed with reference to FIG. 6 of the drawings.

Figure 2:
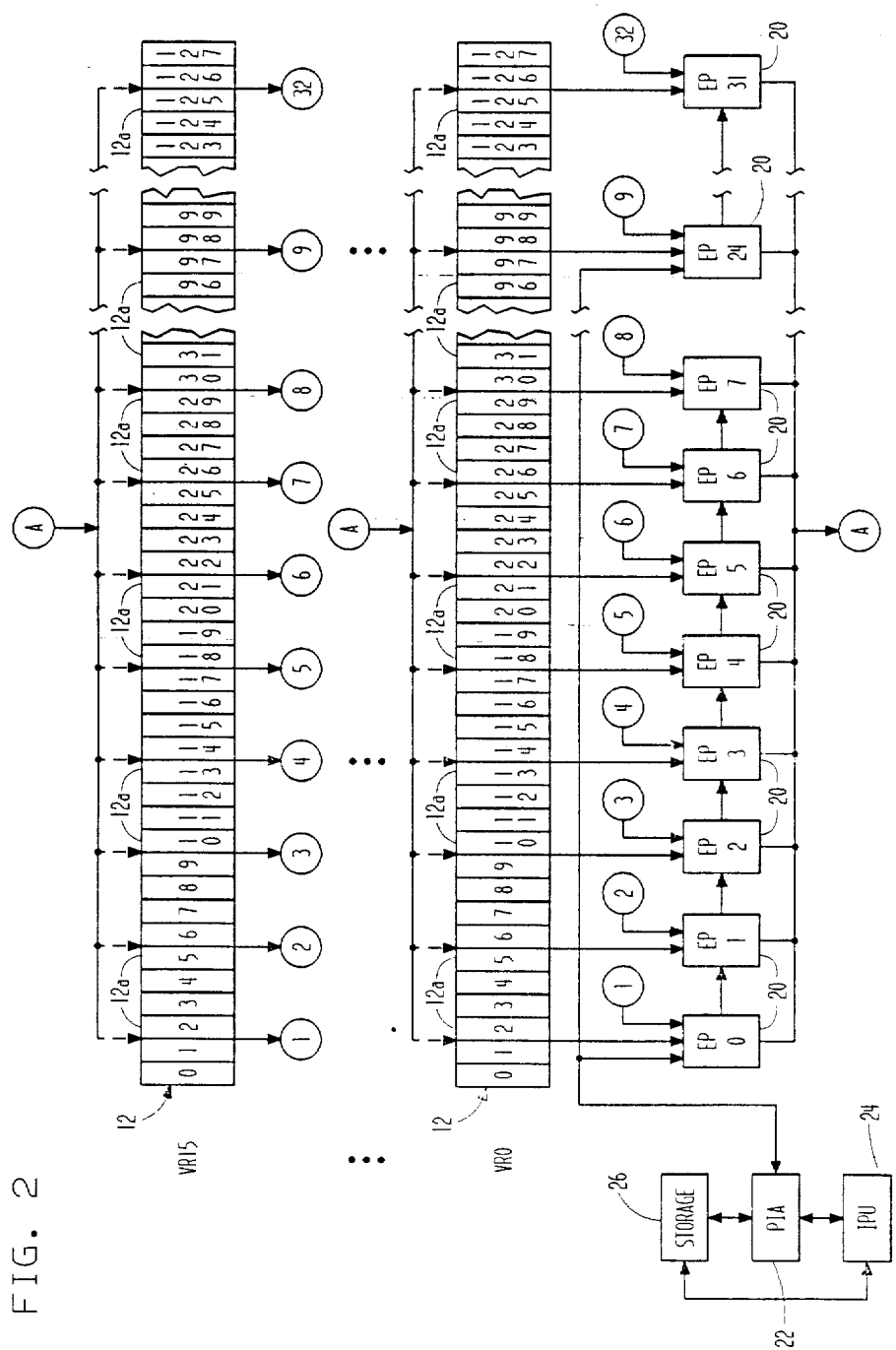
FIG. 2 illustrates the typical parallel vector processor of FIG. 1a wherein the vector registers are subdivided into a plurality of smaller registers, each smaller register containing four elements, an element processor is associated with each smaller register for performing processing operations on the vectors associated with the four elements of the smaller register, and a Processor Interface Adaptor is connected to each of the element processors for instructing each of the element processors to perform the processing operations on the vectors.
Figure 3:
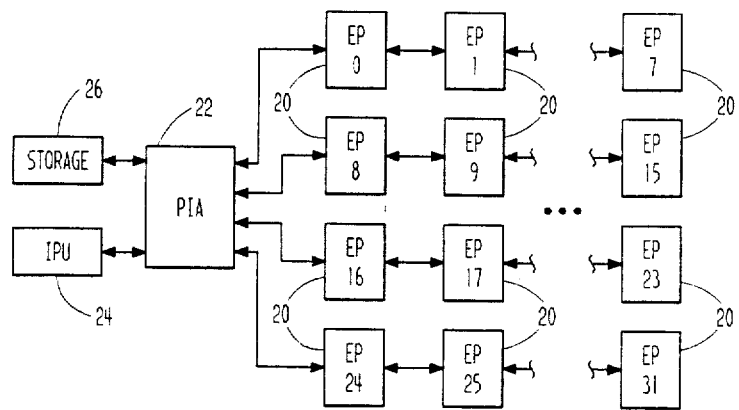
FIG. 3 illustrates the connection of the Processor Interface Adaptor to each of the element processors of FIG. 2.

Referring to FIG. 2, a parallel vector processor is illustrated. In FIG. 2, each of the vector registers VR0 through VR15 of FIG. 1 are subdivided into a plurality of smaller registers 12a, each smaller register 12a containing, for example, four elements. A corresponding plurality of element processors 20 are connected to the plurality of smaller registers 12a for performing processing (arithmetic) operations on the corresponding elements of the vectors stored in vector register VR0 through VR15, each of the element processors 20 performing processing operations on four corresponding elements of said vectors. The results of the processing operation are simultaneously produced by each element processor, in parallel, and may be stored in corresponding locations of any one of the vector registers VR0 through VR15. A processor interface adaptor (PIA) 22 is connected to each of the element processors 20 for transmitting address, data, and command information to each of the element processors. The actual connection of the PIA 22 to each of the element processors 0-13 is illustrated in FIG. 3 of the drawings. An instruction processing unit (IPU) 24 is connected to the PIA 22 for transmitting vector instructions to the PIA 22. A main memory or storage 26 is connected to the PIA 22 for transmitting the data information and address control information to the PIA in response to its request for such data.

Referring to FIG. 3, the actual connection of the PIA 22 to each of the element processors 20 associated with the parallel vector processor of FIG. 2 is illustrated. The PIA 22 is connected to element processors 0, 8, 16, and 24. Element processor 0 is serially connected to element processors 1 through 7. Element processor 8 is serially connected to element processors 9 through 15. Element processor 16 is serially connected to element processors 17 through 23. Element processor 24 is serially connected to element processors 25 through 31.

Figure 4:
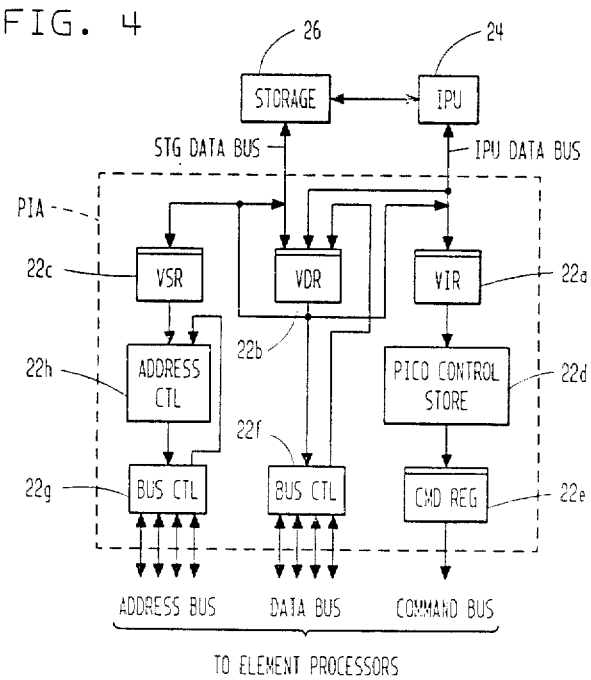
FIG. 4 .illustrates the construction of the Processor Interface Adaptor of FIGS. 2 and 3.

Referring to FIG. 4, the construction of the PIA 22 is illustrated. The PIA 22 includes a vector instruction register (VIR) 22a connected to the IPU 24 for receiving a vector instruction from the IPU and temporarily storing the vector instruction. A vector data register (VDR) 22b is connected to storage 26 and to the IPU 24 for receiving data from storage 26 and temporarily storing the data. A vector status register (VSR) 22c is connected to the storage 26 and to IPU 24 for receiving address control information from storage and for temporarily storing the information. A pico control store 22d is connected to the VIR 22a for decoding the vector instruction stored in the VIR 22a and for selecting a pico control routine stored in the pico store 22d. A command register 22e is connected to the pico control store 22d and to the element processors via a command bus for driving the element processors. A bus control 22f is connected to the VDR 22b for receiving data from the VDR 22b and transmitting the data to the element processors 20 via a data bus. The bus control 22f can also steer data from one element processor to another element processor. The VSR 22c is also connected to a bus control 22g via an address control 22h. The address control 22h generates addresses corresponding to the data received from the VSR 22c. The bus control 22g transmits the generated addresses to the element processors 20 via an address bus.

Figure 5:
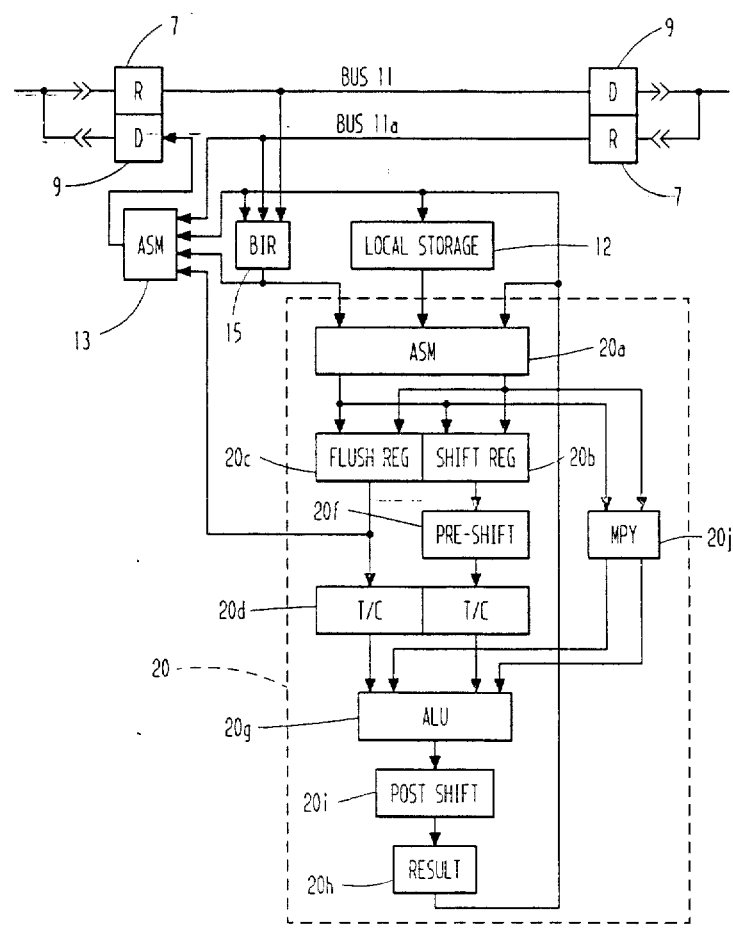
FIG. 5 illustrates a detailed construction of an element processor shown in FIGS. 2 and 3.

Referring to FIG. 5, a block diagram construction of an element processor 20 is illustrated. In FIG. 5, a local storage 12 is analogous to the vector registers 12 shown in FIG. 2 of the drawings. A system bus 11 and 11a is connected to a driver circuit 9 on one end and to a receiver circuit 7 on the other end. A first input data assembler (ASM) 13 is connected to a driver circuit 9 and to a receiver circuit 7. The ASM is further connected to local storage 12 and to the element processor 20. The element processor 20 shown in FIG. 5 comprises a second input data assembler (ASM) 20a connected to the local storage 12 and to the first input data assembler 13. A shift select register 20a and a flush select register 20c are connected to the input data assembler 20a. The flush select register 20c is connected directly to a trues/complement gate 20d whereas the shift select register 20a is connected to another trues/complement gate 20e via a pre-shifter control 20f. The trues/complement gates 20d and 20e are each connected to an arithmetic logic unit (ALU) 20g. The ALU 20g is connected to a result register 20h via a post shifter control 20i, the result register 20h being connected to the local storage 12 for storing a result therein when the element processor 20 has completed an arithmetic processing operation on the four elements of a pair of vectors stored in a corresponding pair of vector 20 registers 12. A multiplier circuit 20j is interconnected between the input data assembler 20a and the ALU 20g. Two operands are received by the multiplier circuit 20j. A sum output and a carry output is generated by the multiplier circuit 20j, the sum and carry outputs being received by the ALU 20g.

The functional operation of the parallel vector processor of FIG. 2 will now be described with reference to FIGS. 2 through 4 of the drawings.

The IPU 24 instructs the PIA 22 to load specific data into vector registers VR0 and VR15. The IPU 24 transmits a LOAD instruction to the PIA 2. The LOAD instruction is temporarily stored in the VIR 22a. The DATA to be loaded into the vector registers VR0 and VR15 is stored in storage 26. When the PIA receives the LOAD instruction, it retrieves specific data from storage 26 and loads said data into the VDR 22b. Previous to the issuance of the LOAD instruction, the IPU 24 loaded address control information into the VSR 22c. As a result, specific address information is generated by the address control 22h. The address information comprises the address of selected element processors 20 into which the data is to be loaded and the address of selected elements associated with the selected element processors 20 into which the data is to be stored. The LOAD instruction, stored in the VIR 22a, is decoded by the pico control store 22d. Command information, corresponding to the LOAD instruction, stored in the pico control store 22d, is selected. In accordance with the address information generated by the address control 22h, the data stored in the VDR 22b is transmitted for storage in the selected processors 20 via the bus control 22f and a data bus. Furthermore, in accordance with the address information generated by the address control 22h, the command information, stored in the pico control store 22d and selected by the decoded LOAD instruction, is transmitted to the selected processors 20 via command register 22e and a command bus. The selected command information causes the data stored in the selected processors 20 to be loaded into the selected elements of the smaller registers 12a, the selected elements being identified by the address information generated by the address control 22h.

Accordingly, assume, by way of example, that a 128 element vector is stored in each of vector (4) byte binary word. Assume further that the following vector arithmetic operation is to be performed on the vectors stored in vector registers VR0 and VR15: VR0 +VR15 >VR15. The IPU 24 instructs the PIA 22 to perform an ADD operation wherein the vector stored in vector register VR0 is 2 to be added to the vector stored in vector register VR15, the results to be stored in vector register VR15. The IPU 24 transmits this ADD instruction to the PIA 22. The ADD instruction is temporarily stored in the VIR 22a. In accordance with the ADD instruction, particular command information stored in the pico control store 22d is selected. As the ADD instruction is received by the PIA 22, the IPU 24 retrieves specific data from storage 26 representative of the addresses of the elements in the smaller registers undergoing the ADD operation and the address of the selected processors 20 which will perform the ADD operation. As a result, address information is generated by the address control 22h. The address information is transmitted to the selected processors 20 via the bus control 22g and an address bus. In accordance with this address information, the selected command information, selected from the pico control store 22d, instructs the selected processors 20 to retrieve the selected elements of its associated smaller register 12a corresponding to vector registers VR0 and VR15. When the elements are retrieved, the selected command information causes the selected processors 20 to execute the ADD instruction. For example, elements 0 through 3, associated with the vectors stored in vector registers VR0 and VR15, are received by element processor number 0. Element processor 0 adds the corresponding elements together, and, in accordance with the selected command information, stores the results of the addition operation in the corresponding locations of vector register VR15. That is, element 0 of vector register VR0 is added to element 0 of vector register VR15, and the sum is stored in the element 0 location of vector register VR15. Elements 1, 2, and 3 of vector registers VR0 and VR15 are similarly added together, the sums being stored in the element 1, 2, and 3 locations of vector register VR15. Elements 4, 5, 6, and 7, associated with vector registers VR0 and VR15, are processed by element processor 1, in the same manner as described above, the processing of these elements being performed simultaneously with the processing of elements 0, 1, 2, and 3. The remaining elements of the vectors, stored in vector registers VR0 and VR15, are processed by element processors 2 through 31, in groups of four elements each, simultaneously with the processing of elements 0 through 3 and elements 4 through 7 by element processors 0 and 1 respectively. As a result, the above referenced vector arithmetic operation, performed on the vectors stored in vector registers VR0 and VR15, is completed in the time required to process four elements of the vector, as compared to the time required to process 128 elements of the vector, of the conventional vector processor systems. Therefore, the parallel vector processor of FIG. 2 represents an improvement over the conventional vector processor systems.

A description of the functional operation of an element processor 20 will be provided in the following paragraphs with reference to FIG. 5 of the drawings.

The functional operation of the element processor 20 shown in FIG. 5 may be subdivided into four cycles of operation: a read local storage and shift select cycle, alternatively known as a first cycle; a pre-normalize shift cycle, known as a second cycle; an ALU operation cycle, known as a third cycle; and a post-normalize shift cycle, known as a fourth cycle.

Utilizing the assumptions made previously, wherein the respective elements of vector registers VR0 and VR15 are added together and the results of the summation operation are stored in vector register VR0, elements 0 through 3 are received by receiver 7 of bus 11a and stored in local storage 12 via ASM 13, the local storage 12 being analogous to the first smaller register 12a shown in FIG. 2 which stores elements 0 through 3. Assume further that the elements 0 through 3 represent floating point element operands.

When a command is issued to add elements 0-3 stored in register VR0 to elements 0-3 stored in register VR15, on the first cycle, the operands of the respective elements are read from the local storage 12 and are temporarily stored in the flush vectors stored in vector registers VR0 and VR15, is register 20c and the shift register 20a via the input data assembler 20a. However, at the same time, the exponents of the respective elements enter an exponent control path (not shown) where the difference in magnitude of the exponents is calculated. Therefore, the element having the smaller exponent is gated to the shift select register 20a whereas the element having the greater The flush and shift select registers 20c and 20a are latched by a latch clock at the end of the first cycle.

At the beginning of the second cycle, a shift operation is started. The element having the greater exponent, stored in the flush select register 20c, is gated into one input of the arithmetic logic unit (ALU) 20g. Shift control information is passed from the exponent control path (not shown) to the pre-shifter 20f wherein the element having the smaller exponent, stored in the shift select register 20a, is right-shifted by the pre-shifter 20f to align said element with the element having the greater exponent, which is currently being gated into the one input of the ALU 20g. Concurrently, the ALU 20g is selecting the appropriate inputs from the trues/-complement gates 20d and 20e for receiving the elements from the flush and shift select registers 20c and 20a via the trues/complement gates 20d and 20e, respectively.

The third cycle, in the operation of the element processor 20 of FIG. 5, is dedicated to the functional operation of the arithmetic logic unit (ALU) 20g. The ALU is an 8-byte high speed carry look ahead adder, designed with 1's complement arithmetic and with end around carry and recomplementation. The ALU performs an addition operation, wherein the bits of four respective elements, in the example, elements 0 through 3 stored in one of the smaller registers 12a, associated with vector register VR0, are added to the bits of four respective elements, associated with vector register VR15. The results of the addition operation are ultimately stored in the local storage 12 (in the example, analogous to the vector register VR0 illustrated in FIG. 2). However, prior to this step, a post-normalization step must take place during the fourth cycle.

When the addition operation is completed by the ALU 20g, a post-normalization step takes place during the fourth cycle. The term "post-normalization", in data processing terms, comprises the steps of detecting leading zero hexadecimal digits in the results produced by the ALU, and left shifting the results in accordance with the number of zero digits detected. The results exponent must be adjusted by decrementing the exponent by a value of 1 for each digit shifted. Digits of the output of the ALU 20g are examined by the post shifter 20i for their zero state, and the results of the ALU output are left shifted in accordance with the number of zero digits detected. The left shifted results of the ALU output are passed to the result register 20h for temporary storage therein. The exponent control path (not shown) increments or decrements the exponent value of the result element (output from the ALU) so that a correct final exponent value is gated to the result register 20h. As a result, a result element is stored in the result register 20h, the operand of with the number of zero digits detected in the ALU output, the exponent of which is the correct final exponent value. During the next cycle, following the fourth cycle, the result element is passed to the local storage 12 for storage therein (the local storage being analogous to one of the smaller registers 12a of FIG. 2, in the example, the smaller register 12a which stores elements 0 through 3).

Figure 6:
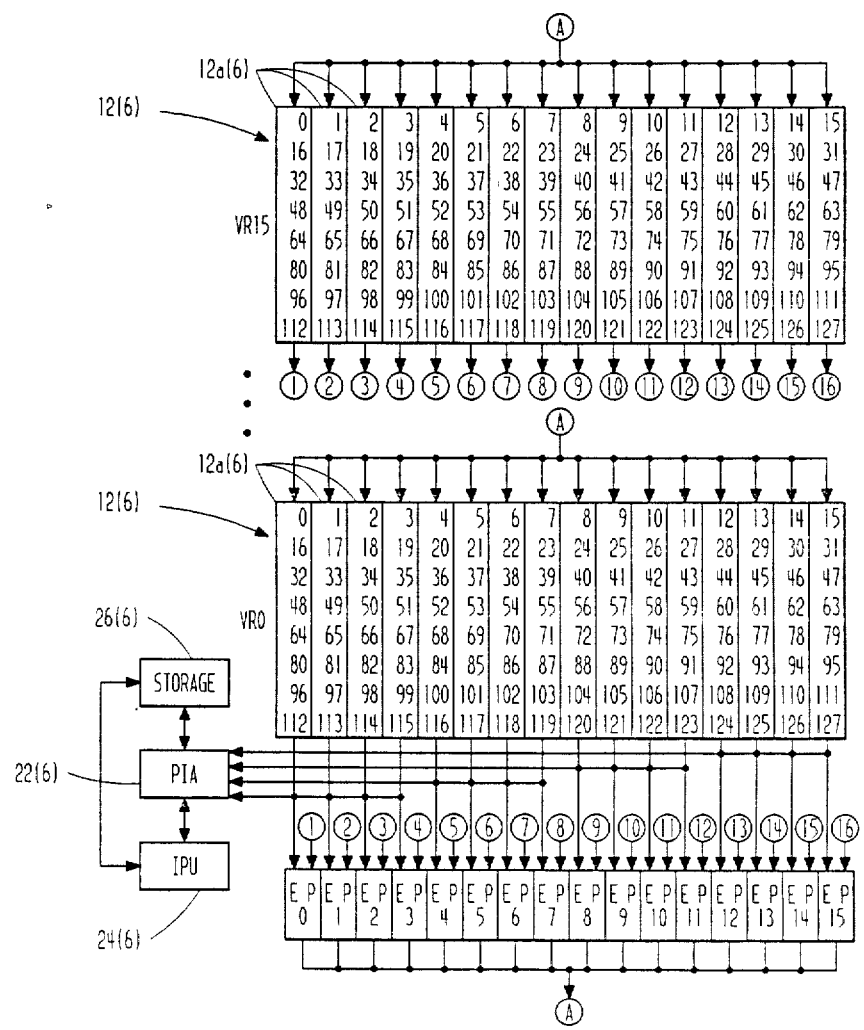
FIG. 6 illustrates the parallel vector processor of FIG. 1a, in accordance with the present invention.

Referring to FIG. 6, a construction of the parallel vector processor in accordance with the present invention is illustrated. In FIG. 6, note that sixteen element processors are illustrated as compared to thirty-two element processors in the FIG. 2 configuration. In FIG. 6, a plurality of vector registers 12(6), numbered VR0 through VR15, are illustrated, each vector register being subdivided into a plurality of smaller registers 12a(6). For example, vector register VR0 is subdivided into a plurality of smaller registers 12a(6), vector register VR2 (not shown) is subdivided into a plurality of smaller registers 12a(6),..., and vector register VR15 is subdivided into a plurality of smaller registers 12a(6). Each smaller register 12a(6) of each vector register 12(6) is connected to its own element processor 20(6), corresponding smaller registers 12a(6) among the plurality of vector registers VR0 through VR15 being connected to the same element processor. For example, smaller registers 12a(6) in vector registers VR0 through VR15 which contain element number 0 are connected to the same element processor 20(6), namely, element processor 0, smaller registers in vector registers VR0 through VR15 which contain element number 1 are connected to the same element processor, namely, element processor 1, etc. Smaller registers which contain element number vectors stored in vector registers VR0 and VR15, is 16 are connected to element processor 15. However, smaller registers which contain element number 16 are connected to element processor 0 once again. The cycle repeats itself until all elements have been assigned to an element processor. In fact, the first successive M elements of an N element vector are assigned to element processors 1 through M, the second successive M elements of the N element vector are assigned to element processors 1 through M, the assignment of the remaining successive elements of the N element vector being made to element processors 1 through M in M element order.

The output of each element processor 20(6) is connected to the input of each vector register 12(6).

Figure 7:
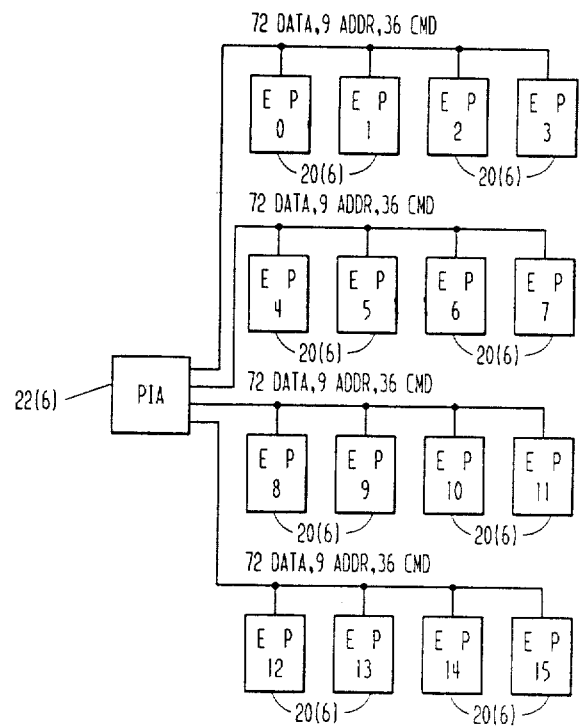
FIG. 7, illustrates the manner of the connection of the PIA to each of the element processors associated with the parallel vector processor in accordance with the present invention shown in FIG. 6.

The PIA 22(6) is connected to each element processor 20(6), the manner of the connection being illustrated in FIG. 6, but being illustrated in greater detail in FIG. 7 of the drawings.

The construction of the PIA 22(6) is the same as the construction of the PIA 22 shown in FIG. 4 of the drawings.

The construction of each of the element processors 20(6) are the same as the construction of the element processor 20 shown in FIG. 5 of the drawings.

The functional operation of the parallel vector processor in accordance with the present invention will be described in the following paragraphs with reference to FIG. 6 of the drawings. The functional operation will be described with reference to four modes of operation: (1) a broadcast (BC) mode, (2) a single processor (SP) mode, (3) a broadcast auto (BA) mode, and (4) an inter-processor (IP) mode.

In FIG. 6, when utilizing the broadcast (BC) mode, assume that the following vector operation should be performed: VR0 +VR 15 >VR15. In this case, all of the elements in the first row of vector register VR0 (elements 0 through 15) are added, simultaneously, and in parallel to all of the elements in the first row of vector register VR15 (elements 0 through 15), and the results of the add operation are stored in the first row of the vector register VR15 (where elements 0 through 15 are stored). Then, elements 16 through 31 of vector register VR0 are added to elements 16 through 31 of vector register VR15 and the results stored in second row of vector register VR15 where elements 16 through 31 are located. This add operation is repeated until elements 112-127 of vector register VR0 are added to elements 112-127 of vector register VR15, the results of the add operation being stored in the last row of vector register VR15 where elements 112-127 are located.

When utilizing the single processor (SP) mode, assume that the elements of vector register VR0 should be added to separate operands retrieved from storage, that is, assume that the following operation should be performed: VR0 +Storage > VR0. In this case, the add operation must be performed sequentially rather than in parallel, that is, element 0 is added to its other operand (from storage) and the result placed in the element 0 slot, element 1 is added to its other operand and the result placed in the element 1 slot, etc, until element 126 is added to its other operand and the result placed in the element 126 slot and element 127 is added to its other operand and the result placed in the element 127 slot of vector register VR0.

The advantage of the vector register configuration shown in FIG. 6 over the vector register configuration shown in FIG. 2 is the following: in FIG. 6, when operands are retrieved from storage or from the GPR, as indicated above, element processor 1 may begin the sequential operation of adding element 1 to its other operand (from the GPR or from storage) without waiting for element processor 0 to complete the addition of element 0 to its other operand (from the GPR or from storage). In FIG. 2, however, when element operand (from the GPR or (from storage), the element processor 0 cannot add element 1 of VR0 to its other operand, that is, the addition of element 1 to its operand must await the completion of the addition of element 0 to its other operand retrieved from storage. Since the time elapsed in retrieving an operand from storage is one cycle, but the time elapsed to perform an add operation in an element processor is five cycles, assuming the processing of element 0 in FIGS. 2 and 6 were to commence simultaneously, the processing of element 1 in the FIG. 6 configuration would begin at a point in time prior to the processing of element 1 in the FIG. 2 configuration. Therefore, the performance of the vector processor shown in FIG. 6 is improved relative to the vector processor shown in FIG. 2.

When utilizing the broadcast auto (BA) mode, all of the element processors (EP 0 through EP15) execute the same command. Each processor addresses the first element in its corresponding smaller register 12a(6) and then, subsequently, addresses the remaining seven elements in its corresponding smaller register 12a(6) thereby "automatically" performing an arithmetic operation on all eight elements stored in the processor's smaller register. The eight elements stored in a smaller register of a vector register are processed in a "pipelined" overlapped mode by its corresponding element processor, all the processors (EP1 through EP15) performing this operation and executing the command in parallel.

When utilizing the inter-processor (IP) mode, data is transferred between element processors (EP0-EP15) 20(6) under control of the PIA shown in FIG. 4. Data is placed on the data bus by the transmitting processor and is taken from the data bus by the receiving processor. The bi-directional bus control is performed by the PIA which controls the operation. This mode is used by commands that require a summing of partial sums that reside in the corresponding element processors as well as by commands involving a "search" of a vector register in the vector processor.

The invention being thus described, it will be obvious that the same may be varied in many ways. Such variations are not to be regarded as a departure from the spirit and scope of the "post-normalization", in data processing terms, invention, and all such modifications as would be obvious to one skilled in the art are intended to be included within the scope of the following claims.

We claim:
1. A vector processor, comprising:
   a plurality of vector registers, wherein each vector register is subdivided into a plurality of smaller registers, each of said smaller registers having a separate output, and each vector register stores a vector, each of said smaller registers storing a plurality of elements of said vector, each vector including a plurality of groups of said elements, each group including a plurality of elements corresponding in number to the plurality of smaller registers, the plurality of elements of each group of a vector stored in a vector register being stored, respectively, in the plurality of smaller registers of the vector register;

a plurality of element processor means connected, respectively, to the plurality of outputs of the corresponding plurality of smaller registers of each of said plurality of vector registers, each of said element processor means being dedicated and connected to a different set of said smaller registers to process any element within the dedicated set, each of said sets comprising one smaller register per vector register, and wherein all the smaller registers in each set store corresponding vector elements of said vectors, each of said element processor means processing, one element at a time, the elements stored in any smaller register of the dedicated set; and controlling means for selecting which groups of elements in the associated vector registers to process, whereby the plurality of element processor means process, at least partially in parallel, the plurality of elements of each selected group, and wherein each of said smaller registers of each vector register stores vector elements whose positions in the vector are defined by the equation $K_1 + N_i \times K_2$ where $K_1$ is a constant which is different for each smaller register within the same vector register, $K_2$ is a constant which is the same for each smaller register within the same vector register and $N_i$ is a sequence of integers.

2. The vector processor according to claim 1 wherein each of said element processor means comprises:

read means for reading one of the elements of the vector stored in one of the vector registers and one of the elements of the vector stored in another of said vector registers;

register means connected to said read means for storing the elements of the vectors read from the vector register means;

pre-shift means connected to the register means for shifting the operands associated with the elements of one vector to align said operands with the operands associated with the elements of the other vector;

operation means connected to the pre-shift means for processing the one or more elements of the vectors stored in said one and said another of said vector registers;

post-shift means connected to the operation means for receiving a set of results from said operation means and shifting the results a predetermined amount in accordance with the number of similar predetermined type of digits in said results; and post operation storage means for storing the set of results, the set of results being passed to one of the plurality of vector registers for storage therein.

3. A vector processor as set forth in claim 1, wherein said smaller registers of each vector register form a sequence of columns, and all of said smaller registers for each vector register grouped together yield rows of vector elements, position numbers of the vector elements within each row forming a sequence in consecutive order from one side column to the opposite side column, whereby a group of vector elements output from the vector register comprise consecutive vector elements to facilitate processing.

4. A vector processor as set forth in claim 1 wherein said plurality of element processor means include a first set of element processor means and a second set of element processor means, the first and second sets of element processor means having inputs; and further comprising an instruction processing unit; and a storage; and wherein said controlling means is connected, on one end, to the inputs of said first set of said element processor means and to the inputs of said second set of said element processor means and, on the other end, to an output of said storage and an output of said instruction processing unit for controlling the selection of said first set of said element processor means and of said one or more of said vector registers connected to said first set of said element processor means, and the selection of said second set of said element processor means and of said one or more of said vector registers connected to said second set of said element processor means, the selection of said first set of said element processor means controlling the processing of corresponding elements of the plurality of elements of a group stored in said one or more of said vector registers, the selection of said second set of said element processor means controlling the processing of corresponding elements of the plurality of elements of said group stored in said one or more of said vector registers.

5. The vector processor of claim 4, wherein the controlling means comprises:

means connected to said storage and to said instruction processing unit for generating first and second address information, said first address information being transmitted to said first set of element processor means, said second address information being transmitted to said second set of said element processor means, and means connected to said storage and to said instruction processing unit for generating command information, said command information being transmitted to said first and second set of element processor means, said first set of said element processor means being identified and selected by said first address information, said one or more of said vector registers associated with the selected first set of said element processor means being identified and selected by said first address information, said second set of said element processor means being identified and selected by said second address information, said one or more of said vector registers associated with the selected second set of said element processor means being identified and selected by said second address information.

6. The vector processor of claim 5, wherein:

each of the element processor means has an output, the plurality of element processor means having a plurality of outputs, and each of the smaller registers of the vector registers has an input, the plurality of smaller registers of said vector registers having a plurality of inputs, the plurality of outputs of said plurality of element processor means are connected to the plurality of inputs of said plurality of smaller registers of said vector registers, the plurality of element processor means process the corresponding plurality of elements of each group stored, respectively, in said plurality of smaller registers of said one or more of said vector registers in accordance with said command information thereby producing said corresponding plurality of results and storing the results in the plurality of element processor means, said plurality of results stored in said plurality of element processor means are transferred to one of said vector registers for storage therein in accordance with said first and second address information via the connection of the plurality of outputs of said plurality of element processor means to the plurality of inputs of said plurality of smaller registers of said one of said vector registers.

7. A vector processor as set forth in claim 1 wherein each of said smaller registers stores elements of only one vector.

* * * * *